(12) United States Patent
Alurralde et al.

(10) Patent No.: US 8,309,043 B2
(45) Date of Patent: Nov. 13, 2012

(54) RECOVERY OF LI VALUES FROM SODIUM SATURATE BRINE

(75) Inventors: Pablo Alurralde, Salta (AR); Vijay Mehta, Gastonia, NC (US)

(73) Assignee: FMC Corporation, Philadelphia, PA (US)

( * ) Notice: Subject to any disclaimer, the term of this patent is extended or adjusted under 35 U.S.C. 154(b) by 0 days.

(21) Appl. No.: 13/288,389

(22) Filed: Nov. 3, 2011

(65) Prior Publication Data

US 2012/0141342 A1    Jun. 7, 2012

Related U.S. Application Data

(60) Provisional application No. 61/420,042, filed on Dec. 6, 2010.

(51) Int. Cl.
*C01D 15/00*   (2006.01)

(52) U.S. Cl. .................. 423/179.5; 252/184; 23/295 S; 23/306

(58) Field of Classification Search ............... 423/179.5, 423/181; 23/295 S, 306; 252/184
See application file for complete search history.

(56) References Cited

U.S. PATENT DOCUMENTS

| | | | |
|---|---|---|---|
| 3,099,528 A | 7/1963 | Hadzerign | |
| 3,306,700 A | 2/1967 | Neipert et al. | |
| 4,116,856 A | 9/1978 | Lee et al. | |
| 4,116,858 A | 9/1978 | Lee et al. | |
| 4,159,311 A | 6/1979 | Lee et al. | |
| 4,221,767 A | 9/1980 | Lee et al. | |
| 4,291,001 A | 9/1981 | Repsher et al. | |
| 4,347,327 A | 8/1982 | Lee et al. | |
| 4,348,295 A | 9/1982 | Burba | |
| 4,348,296 A | 9/1982 | Bauman et al. | |
| 4,348,297 A | 9/1982 | Bauman et al. | |
| 4,376,100 A | 3/1983 | Lee et al. | |
| 4,381,349 A | 4/1983 | Lee et al. | |
| 4,430,311 A | 2/1984 | Lee et al. | |
| 4,461,714 A | 7/1984 | Burba | |
| 4,472,362 A | 9/1984 | Burba | |
| 4,472,962 A | 9/1984 | Mennenga | |
| 4,477,367 A | 10/1984 | Burba | |
| 5,389,349 A * | 2/1995 | Bauman et al. | 423/179.5 |
| 5,599,516 A | 2/1997 | Bauman et al. | |
| 6,017,500 A * | 1/2000 | Mehta | 423/179.5 |
| 6,555,078 B1 * | 4/2003 | Mehta | 423/179.5 |
| 2011/0300041 A1 * | 12/2011 | Galli et al. | 423/179.5 |

FOREIGN PATENT DOCUMENTS

EP     0117316 A1    9/1984

OTHER PUBLICATIONS

Notification of Transmittal of the International Search Report and the Written Opinion of the International Searching Authority, or the Declaration corresponding to International Application No. PCT/US2011/059673 mailed Jan. 23, 2012.

* cited by examiner

*Primary Examiner* — Steven Bos
(74) *Attorney, Agent, or Firm* — Myers Bigel Sibley & Sajovec, PA

(57) ABSTRACT

The present invention provides a process for recovering Li values from a sodium saturated brine. The process includes recovering Li values from a sodium saturated brine which contains LiX. The process includes concentrating the sodium saturated brine to at least 9000 mg/l LiX, passing the concentrated brine through a bed of polycrystalline hydrated alumina pellets until the pellets are loaded with LiX from the concentrated brine, displacing brine held-up in the bed by using concentrated NaX, unloading LiX from the pellets by flowing through the bed an aqueous solution of LiX which is not saturated, displacing the LiX from the bed using concentrated NaX, and repeating the steps at least one additional time to provide the Li values.

6 Claims, No Drawings

RECOVERY OF LI VALUES FROM SODIUM SATURATE BRINE

CROSS-REFERENCE TO RELATED APPLICATIONS

This application claims the benefit of, and incorporates herein by reference in its entirety, the following United States Provisional Application: U.S. Provisional Application No. 61/420,042, filed Dec. 6, 2010.

FIELD OF THE INVENTION

The present invention relates to extracting lithium values from brine.

BACKGROUND OF THE INVENTION

A number of naturally occurring brines contain a significant amount of lithium values. The lithium values often can be recovered as precipitated lithium carbonate using techniques such as stage-wise evaporative concentration of the brine followed by treatment of the concentrated brine with soda ash. Exemplary references include U.S. Pat. Nos. 4,116,856, 4,116,858, 4,159,311, 4,221,767, 4,291,001, 4,347,327, 4,348,295, 4,348,296, 4,348,297, 4,376,100, 4,381,349, 4,430,311, 4,461,714, 4,472,362, 4,477,367, 4,472,962, and 5,599,516, the disclosures of which are incorporated herein by reference in their entireties.

The extracted lithium values have use, for example, in nuclear fissure reactors, in lithium batteries, and the synthesis of compounds for pharmaceutical uses.

The existing processes for extracting lithium brines; however, often suffer from slow throughput and may be cost ineffective.

SUMMARY OF THE INVENTION

To this end, the process of the present invention provides a more efficient and higher throughput process for recovering Li values from a sodium saturated brine. The process includes recovering Li values from a sodium saturated brine which contains LiX. The process comprising concentrating the sodium saturated brine to at least 9000 mg/l LiX, passing the concentrated brine through a bed of pellets comprising polycrystalline hydrated alumina until the pellets are loaded with LiX from the concentrated brine, displacing brine held-up in the bed by using concentrated NaX, unloading LiX from the pellets by flowing through the bed an aqueous solution of LiX which is not saturated, displacing the LiX from the bed using concentrated NaX, and repeating the steps at least one additional time to provide the Li values.

DETAILED DESCRIPTION OF THE INVENTION

The foregoing and other aspects of the present invention will now be described in more detail with respect to the description and methodologies provided herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise. Also, as used herein, "and/or" refers to and encompasses any and all possible combinations of one or more of the associated listed items. Furthermore, the term "about," as used herein when referring to a measurable value such as an amount of a compound, dose, time, temperature, and the like, is meant to encompass variations of 20%, 10%, 5%, 1%, 0.5%, or even 0.1% of the specified amount.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms, including technical and scientific terms used in the description, have the same meaning as commonly understood by one of ordinary skill in the art to which this invention belongs.

The term "consists essentially of" (and grammatical variants), as applied to the methods in this invention, means the methods or compositions can contain additional steps as long as the additional steps or components do not materially alter the basic and novel characteristic(s) of the present invention.

The term "consisting of" excludes any additional step that is not specified in the claim.

Unless the context indicates otherwise, it is specifically intended that the various features of the invention described herein can be used in any combination.

Moreover, the present invention also contemplates that in some embodiments of the invention, any feature or combination of features set forth herein can be excluded or omitted.

All patents, patent applications and publications referred to herein are incorporated by reference in their entirety. In case of a conflict in terminology, the present specification is controlling.

As one of ordinary skill in the art may appreciate, the parameters described herein may vary greatly depending on the process, formulation and/or apparatus as well as the desired properties of the final product.

The present invention provides a process for recovering Li values from a sodium saturated brine which contains lithium compounds, i.e., LiX wherein X is nitrate, sulfate, bicarbonate, halide or other acid salt moiety. In one embodiment, the lithium compound is LiCl. Sources of the sodium saturated brine include seawater and subterranean brines such as from Smackover formulation. The processes of the invention improve throughput and provide cost advantages.

In one embodiment, the process of the present invention comprises:
   (a) concentrating the sodium saturated brine to at least 9000 mg/l LiX;
   (b) passing the concentrated brine through a bed of pellets comprising polycrystalline hydrated alumina until the pellets are loaded with LiX from the concentrated brine;
   (c) displacing brine held-up in the bed by using concentrated NaX;
   (d) unloading LiX from the pellets by flowing through the bed an aqueous solution of LiX which is not saturated;
   (e) displacing the LiX from the bed using concentrated NaX; and
   (f) repeating steps (b) through (e) at least one additional time to provide the Li values.

In one embodiment the step of concentrating comprises pre-evaporating the brine to the desired concentration level.

Pre-evaporation may include heating to a temperature of 25 to 120° C., or exposing to sunlight for 0 to 180 days.

With respect to the polycrystalline hydrated alumina pellets, suitable pellets are described in U.S. Pat. No. 5,599,516, the disclosure of which is incorporated herein by reference in its entirety. In one embodiment, it is preferable to use polycrystalline pellets of hydrated alumina known as crystalline gibbsite, such as that which is commercially available as LaRoche H-30™, Reynolds Metal RH-30™, and Alcoa C-30™. Other polycrystalline pellets can be used, such as those made from bayerite, norstrandite or bauxite. The process known as the Bayer process is used to manufacture polycrystalline hydrated alumina from various alumina-containing ores or minerals (usually bauxite) to make a coarse product which is suitable for use in this invention. Preferably the particle size of the pellets is not smaller than about 140 mesh, U.S. standard sieve size, and can be as large as about 10 mesh U.S. standard sieve size.

The concentrated brine is passed through a bed of the pellets in an amount to provide $LiX/Al(OH)_3$ containing, from about 0.2 to 0.33 mol fraction of LiX as an intercalant. This is readily done in a vessel at an ambient temperature in the range of 0° C. to 25° C. for 24 to 48 hours while adding sufficient pure water to keep the pellets submerged.

Preparation of pellets for use in the recovery of LiCl from brine consists in the neutralization of the $LiOH/Al(OH)_3$ pellets with dilute HCl in excess $H_2O$, preferably in the presence of $NaHCO_3$ as a buffer at pH of about 5 to 6. This neutralization step can be done at ambient temperature, and does not normally require more than a few minutes of good mixing, depending on the size of the mixing vessel. The buffer is to assure that the acidity does not become excessive.

Once the hydrated alumina has been infused with an initial amount of LiOH and neutralized with an acid to provide active LiX sites of up to 0.33 mol fraction, the LiX is washed out with water to remove much of the "loadings" of the active sites and the "unloaded" sites are efficiently used to take up more LiX from brine, and used again a plurality of times before becoming exhausted.

In another embodiment, the lithium exhausted or depleted waste brine may be transferred to a solar evaporation pond. The depleted brine may be treated with lime; magnesium, calcium, and sulfate will be rejected/precipitated partially or completely as $Mg(OH)_2$ and gypsum $(CaSO_4 2H_2O)$ in the pond. The lime-treated brine is then evaporated in the series of ponds to precipitate the salt (NaCl) first and subsequently sylvenite (NaCl:KCl) and sylvite (KCl). The potash salts from the ponds may then be harvested time to time and may be processed to make KCl.

The potash ponds end brine may also be used to recover boron as a boric acid. The end brine from the boron recovery step, could be recycled to the lithium selective absorption plant or to $LiCl/Li_2CO_3$ plant to recover any remaining lithium values which were not fully recovered. The advantage of removing lithium from the start brine by this process, and removing Mg and $SO_4$ from the lithium depleted brine allow higher recovery of potash in the ponds and in the potash plant due to substantially less lithium and magnesium impurities.

The following example is merely illustrative of the invention, and is not limiting thereon.

EXAMPLE 150 ml of $LiCl/Al(OH)_3$ pellets made as in above example are used in recovering lithium values from a sodium saturated natural brine containing at least 9000 mg/liter lithium chloride. Operation include two sodium chloride streams.

The lithium absorbent bed is prepared by placing the $LiCl/Al(OH)_3$ pellets in a jacketed glass column of 1" diameter and 2' high with a water jacket heated capacity of up to 80° C. Run water up flow at a rate to give 50% bed expansion for 20 to 30 minutes. Next follow the steps as below.

1. Run 450 ml brine up flow after pre-treatments to the glass column at a rate to give 50% bed expansion.
2. Allow bed to settle and drain supernatant brine from the top of the bed.
3. Run down flow 52.5 ml of sodium saturated brine to displace the inner-pellet brine. The effluent is saved for recycle to step 1 in the next cycle.
4. Run down flow 195 ml of sodium saturated brine containing 9000 mg/liter LiCl. The effluent is solar evaporated to provide sodium chloride for the circuit and further evaporation of lithium depleted brine to provide for recovery of potash and boron.
5. Run down flow 90 ml of sodium chloride saturated brine containing LiCl. The effluent is saved for recycle to step 4 in the next cycle.
6. Run down flow of 52.5 ml of 0.76 mol/liter LiCl. The effluent is recycled to step 5 in the next cycle.
7. Run down flow 76.5 ml of 0.76 mol/liter LiCl. 39 ml of effluent is saved as product and 37.5 ml is re-saturated with NaCl and is fed to step 5 in the next cycle.
8. Run down flow about 210 ml of water. About 130 ml of effluent is fed to step 6 and 7 in the next cycle and 80 ml of effluent is re-saturated with NaCl and is fed to step 4 in the next cycle.
9. Run down flow 52.5 ml of brine. The effluent is returned to water storage.
10. Run 450 ml of brine up flow at the rate to give 50% bed expansion. This step 10 is the same as step 1 start of the cycle.

Each cycle produces greater than 0.52 mol LiCl per liter of pellet bed at a concentration of greater than 2.0 mol/liter with the use of about 1.0 liter of water.

With the above cycle example, it was confirmed that the cycle time was improved greater than 27.5% by using brine containing lithium chloride 9000 mg/liter versus 4500 mg LiCl concentration/liter of brine and there was a greater than 40% cycle time improvement achieved over 2200 mg LiCl/liter of brine usage.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

What is claimed:

1. A process of recovering Li values from a sodium saturated brine which contains LiX, wherein X is selected from the group consisting of halide, nitrate, sulfate and bicarbonate, said process comprising:
   (a) concentrating the sodium saturated brine to at least 9000 mg/l LiX;
   (b) passing the concentrated brine through a bed of pellets comprising polycrystalline hydrated alumina until the pellets are loaded with LiX from the concentrated brine;
   (c) displacing brine held-up in the bed by using concentrated NaX;
   (d) unloading LiX from the pellets by flowing through the bed an aqueous solution of LiX which is not saturated;
   (e) displacing the LiX from the bed using concentrated NaX; and
   (f) repeating steps (b) through (e) at least one additional time to provide the Li values.

2. The process of claim 1 wherein LiX is LiCl and NaX is NaCl.

3. The process of claim 1 wherein the step of concentrating comprises exposing the sodium saturated brine to sunlight.

4. The process of claim 1 wherein the concentrated NaX is saturated NaX and is kept saturated by additional NaX.

5. The process of claim 1 wherein the displaced LiX of step (e) is evaporated to provide the Li values.

6. The process of claim 1 wherein any waste brine is treated with lime and evaporated in a pond to precipitate NaCl, sylvenite and/or sylvite.

* * * * *